UNITED STATES PATENT OFFICE.

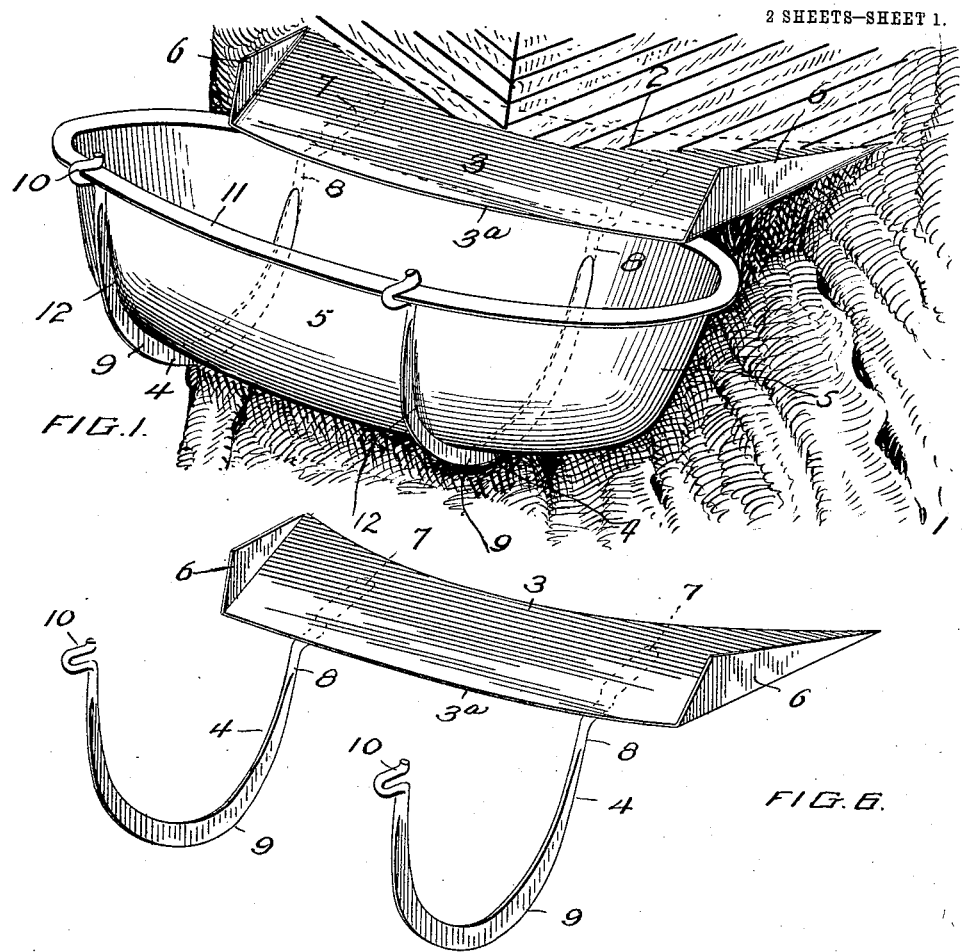

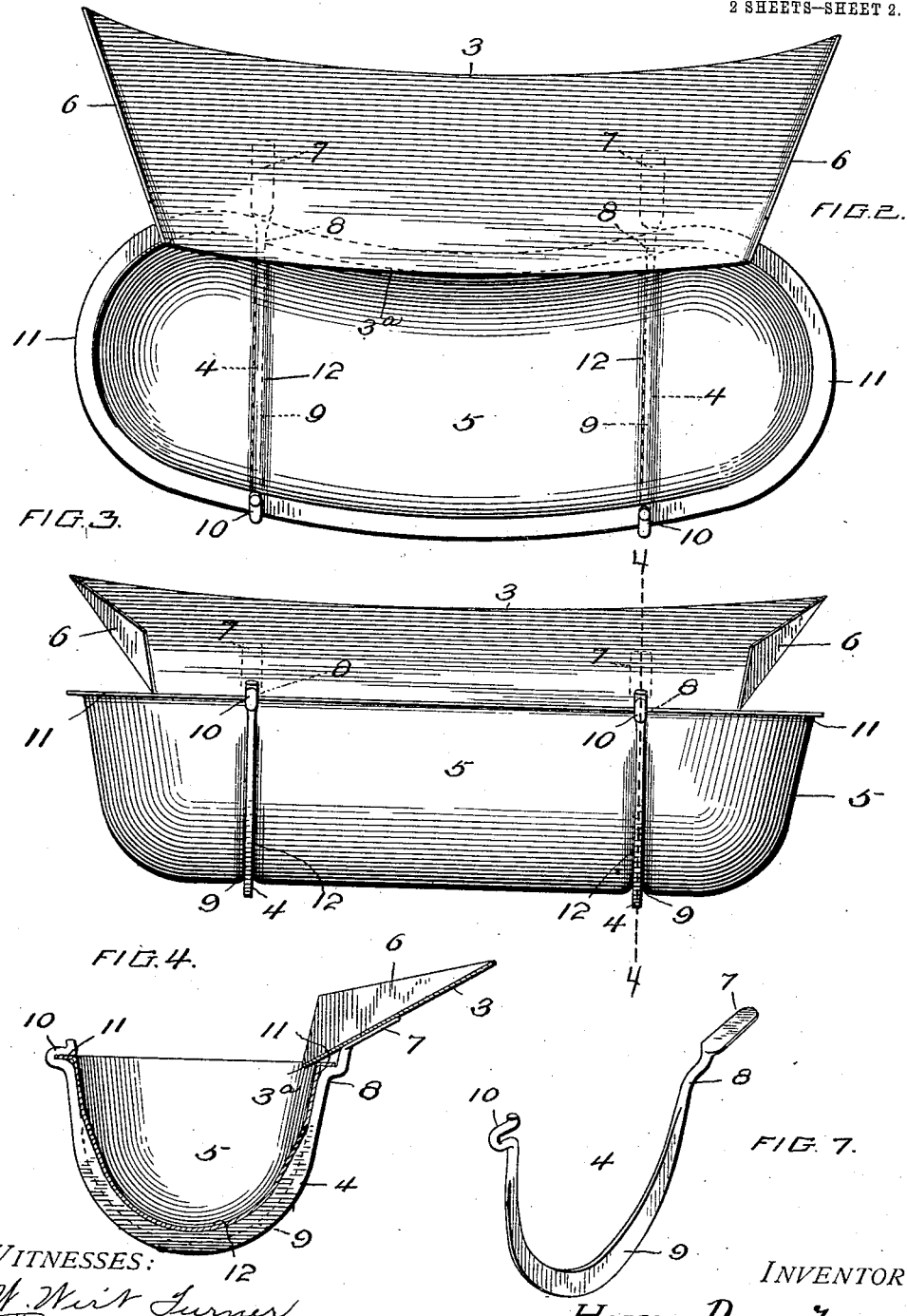

HENRY BREEDEN, OF VIENNA, VIRGINIA.

SAP-RECEIVING APRON AND RECEPTACLE.

1,051,981.  Specification of Letters Patent.  Patented Feb. 4, 1913.

Application filed May 28, 1912. Serial No. 700,205.

*To all whom it may concern:*

Be it known that I, HENRY BREEDEN, a citizen of the United States, residing at Vienna, in the county of Fairfax and State of Virginia, have invented certain new and useful Improvements in Sap-Receiving Aprons and Receptacles, of which the following is a specification.

My invention relates to an improved sap receiving apron and cup and has for its object to provide a sap receiving apron having arms extending therefrom whereby the sap cup is held firmly in place against accidental displacement, at the same time arranged so that the cup can be quickly removed for emptying.

My preferred form of sap cup is of a form and construction to provide for nesting compactly for shipment; it also is designed to somewhat conform to the surface of the tree, which offers as little projection therefrom as possible. It is constructed of a single piece of metal drawn to shape, said shape having the greatest capacity possible for the amount of metal used; there being no seams the liability of leaks is removed.

Another object in view is to provide a sap cup having a rounded bottom and ends, from which the sap can be thoroughly removed in the usual way, there being no corners into which a portion of the sap can collect and remain after emptying.

A further object in view is a sap cup which will not be fractured when its contents are frozen. The grooves extending around the bottom of the cup permit the expansion of the contents incident to freezing thereof.

Another object is to provide a cup having no seams, sharp corners or creases which can be galvanized, or otherwise treated to prevent rusting more thoroughly than a cup having any of the above objectionable features. The protecting coating will not thoroughly cover all the surface of the old form of cup, thereby leaving portions to rust. This is obviated in my construction as all surfaces are free to the action of the cleansing acid as well as to any protecting coating to be applied to the cup to make it more durable.

Another object is to provide an apron having means for securing the cup in a firm horizontal position which insures the greatest capacity for the cup and prevents its swing and discharging part of its contents when disturbed either by animals or the wind.

In the drawings, Figure 1 is a perspective view of a sap-receiving apron and receptacle applied to a tree. Fig. 2 is a plan view of my device. Fig. 3 is a front elevation of same. Fig. 4 is a vertical section taken on the line 4—4 of Fig. 3. Fig. 5 is a detailed view of the cup. Fig. 6 is a detailed view of the apron and its attached hooks; and Fig. 7 is a detailed view of one of the hooks detached from the apron.

In the drawings like references refer to like parts in the several figures.

The numeral 1 designates a turpentine or other sap bearing tree, in the incision 2 of which the apron 3 is inserted, and 4 are hooks which form supporting means for the sap cup 5, said hooks 4 being rigidly secured to or being a part of the apron. The apron, as will be seen in the drawings, is formed of a single sheet of metal having turned-up ends as shown at 6 to form a reduced outer edge for directing the sap into the sap cup, said flanges acting also as means for strengthening the apron to prevent the outer edge of same sagging under the weight of the sap cup. Said hooks are each preferably formed of a piece of stout wire flattened horizontally at the portion 7 in contact with the apron, by which it is secured to the apron either by rivets or soldering. The hooks are provided with a spring portion 8 which is in its normal or round cross section and are, flattened vertically, as shown at 9 where they extend beneath the sap cup which gives greater rigidity and sustaining power in a vertical plane. The hooks are each provided at their outer extreme ends, which is, as in the spring portion, left in its normal or round cross section; with a U-shaped loop 10 in which the flange of the sap cup rests. The sap cup 5 is formed of a single piece of metal or other similar material drawn into the desired shape, which in the drawings shows it to be an elongated U-shaped dish having a slight curve which somewhat corresponds to the curve of the circumference of the tree, when the device is in position, which causes the sap cup to lie closer to the tree at all points and avoids its projecting any farther than is necessary.

The outer edge 3ª of the apron is curved to correspond to the curve of the sap cup and rests immediately above and in contact with the inner flange of said sap cup. The sap cup 5 is provided with a flange 11 which entirely encircles the cup at its top edge, said flange at the inner edge of the sap cup resting beneath the outer edge of the apron and on top of the spring portion 8 of the wire hooks, which firmly secures the cup along its inner edge. Said flange 11 on the outer edge of the cup rests in the U-shaped portions 10 of the hooks which firmly holds the cup along its outer edge. The sap cup is further provided with grooves 12 formed in the side and bottom portions thereof and into which the flattened portions 9 of the hooks settle when the cup is in position; by these means it will be seen that the cup is firmly supported against accidental lateral displacement by said grooves and also against vertical displacement by its flange, which is frequently the case with other sap cups, animals or the elements being the cause of said displacement.

In my device it will be observed that the sap cup is shown in a form best adapting it to be nested, which is of a great importance in economical shipment of same, and it is of a form also which provides the greatest capacity with the least amount of metal necessary in its construction, which is of great importance when the number usually required is considered.

While I have shown and described my invention to be of metal, any suitable material may be used and while the hooks or sap cup supports are shown as separate parts secured to the apron, it will be understood that these hooks may be the integral part of the apron which will serve the purpose as well.

The sap cup as shown, offers the following distinct advantages over the cups now in use: The rounded ends which are somewhat closer to the tree owing to the curved form of the cup are less liable to be caught on any passing object. It is of a form that will nest very compactly for shipment. It is held in a horizontal position which permits of its being filled to its full capacity. It is seamless, thereby having no waste metal and offering no creases into which the protecting fluid will not enter, thus leaving said surfaces free to rust and fracture. It is provided with grooves primarily as seats for the supporting arms but they also offer a surplus of metal to allow for expansion when the contents of the cup are frozen.

It weighs less than any other form of cup having the same capacity. It is of a form to permit the complete scooping out of its contents with a paddle, as is the practice in emptying, there being no corners into which the removing paddle will not enter.

Slight changes in the form and minor details of construction may be resorted to without departing from the spirit of the invention.

Having thus described my invention, what I claim as new and desire to secure by Letters Patent, is:—

1. In a device of the class described, an apron adapted to be supported upon a tree, a sap receptacle provided with a projection at one edge, and resilient arms carried by said apron and extending beneath said receptacle to engage the projection thereon.

2. In a device of the class described, an apron adapted to be supported upon a tree, resilient arms secured to the under face of the apron and having loops at their outer ends, and a sap receptacle supported by said arms and provided with a flange to engage said loops.

3. In a device of the class described, a sap receptacle provided with grooves formed therein, a supporting apron, and extensions carried thereby to enter said grooves and embrace the bottom of the receptacle.

4. In a device of the class described, a supporting apron, resilient supporting means secured to said apron, a sap receptacle having grooves upon its under face to receive said supporting means, and an outwardly extending flange at its upper edge to engage said means.

5. In a device of the class described, a supporting apron, U-shaped supporting arms carried thereby, and a sap receptacle having a flange at its upper edge to rest upon said arms beneath said apron and to be retained in position by the free ends of said arms.

6. In a device of the class described, a supporting apron, arms secured to said apron and provided at their free ends with an inturned portion, and a sap receptacle having a flange at its upper edge supported at the secured ends of said arms and extending beneath the inturned portions thereof.

7. In a device of the class described, a supporting apron, an elongated U-shaped sap receptacle having grooves in its under face, supporting arms secured to said apron and disposed within said grooves, and a retaining catch carried by the free ends of said arms to engage the outer edge of said receptacle.

8. In a device of the class described, a supporting apron, a U-shaped arm secured thereto at one end and having a flattened portion intermediate of its ends, and a sap cup disposed in said arm above said flattened portion.

9. In a device of the class described, a supporting apron, a U-shaped arm secured thereto at one end and having a flattened portion intermediate of its ends, and a hooked portion at the free end of said arm adapted to engage a lateral flange at the upper edge of said cup.

In testimony whereof I affix my signature in presence of two witnesses.

HENRY BREEDEN.

Witnesses:
G. J. WEBER,
ARTHUR K. MOORE.

Copies of this patent may be obtained for five cents each, by addressing the "Commissioner of Patents, Washington, D. C."